United States Patent [19]

Sweeney et al.

[11] Patent Number: 5,755,279
[45] Date of Patent: May 26, 1998

[54] HEAT EXCHANGER

[75] Inventors: Paul Alfred Sweeney, Basking Ridge; Chien-Kuo Lee, Park Ridge, both of N.J.

[73] Assignee: The BOC Group, Inc., New Providence, N.J.

[21] Appl. No.: 625,483

[22] Filed: Mar. 29, 1996

[51] Int. Cl.[6] ........................................... F28D 3/04
[52] U.S. Cl. ............................ 165/115; 165/166; 62/903
[58] Field of Search ..................... 165/115, 166, 165/174; 159/13.1, 13.2, 13.3, 28.6; 62/903

[56] References Cited

U.S. PATENT DOCUMENTS

| | | | |
|---|---|---|---|
| 3,992,168 | 11/1976 | Toyama et al. | 165/166 X |
| 4,585,055 | 4/1986 | Narayama et al. | 165/115 |
| 4,614,229 | 9/1986 | Oldweiler | 165/115 |
| 5,333,683 | 8/1994 | Arriulou et al. | 165/166 |

*Primary Examiner*—Leonard R. Leo
*Attorney, Agent, or Firm*—David M. Rosenblum; Salvatore P. Pace

[57] ABSTRACT

A heat exchanger for indirectly exchanging heat between first and second fluids. The heat exchanger is provided with a plurality of parallel plates to define first and second heat exchange passages for the first fluids to undergo indirect heat transfer. Corrugated fin-type material is positioned within the first and second heat exchange passages to increase the heat transfer area within the first and second heat exchange passages. Liquid distribution means are provided for distributing liquid composed of the second fluid to the second heat exchange passages. Overflow weirs are provided in such distribution means from which liquid overflows and falls into the second heat exchange passages. The overflow weirs are positioned to feed both sides of the second heat exchange passages and the corrugated fin-type material of the second heat exchange passage extend above the second heat exchange passage to ensure entry of the liquid into each corrugation. In such wetting of all corrugations is promoted.

5 Claims, 4 Drawing Sheets

HEAT EXCHANGER

BACKGROUND OF THE INVENTION

The present invention relates to a heat exchanger for indirectly exchanging heat between first and second fluids. More particularly, the present invention relates to such a heat exchanger of the type known as a falling film evaporator or downflow reboiler. Even more particularly, the present invention relates to such a heat exchanger in which a plurality of spaced apart parallel plates define alternating heat exchange passages for the first and second fluids. Still even more particularly, the present invention relates to such a heat exchanger in which corrugated fin-type material is located within the heat exchange passages. Yet, even more particularly, the present invention relates to such a heat exchanger in which the corrugated fin-type material located within the heat exchange passages that receive liquid are positioned to extend above the heat exchange passages to ensure entry of the liquid into each of the corrugations thereof. Yet, still even more particularly, the present invention relates to such a heat exchanger in which the heat exchange passages that receive the liquid are fed from overflow weirs.

Falling film evaporators and downflow reboilers are heat exchangers that employ a plurality of heat exchange passages to bring fluids into an indirect heat exchange relationship. Such heat exchangers are employed as a condenser/reboiler of a double column air separation unit to condense gaseous nitrogen against the vaporization of liquid oxygen.

Typically, in case of air separation applications, inlet and outlet manifolds are provided for introducing and discharging nitrogen into and from one set of heat exchange passages. Liquid oxygen is introduced into another set of heat exchange passages by a liquid distributor. It is important that the liquid be evenly distributed into the heat exchange passages because uneven distribution results in the heat exchanger not meeting its expected performance. Such uneven distribution can also result in dryout and solidification of heavier components in the air. These heavy components can be hydrocarbons such as acetylene which in the presence of oxygen can present a flammability hazard.

The distribution problem becomes particularly pronounced because the heat exchange passages are filled with corrugated material of the type known as corrugated fin-type material. As the density of the corrugated material increases and thus, the number of corrugations increase in number, it becomes very difficult to ensure that all of the corrugations will remain wet with liquid during operation of the heat exchanger.

As will be discussed, the present invention provides distributor for a heat exchanger of the type mentioned above that acts to promote the wetting of all corrugations of the corrugated fin-type material located within the heat exchange passages that receive the liquid.

SUMMARY OF THE INVENTION

The present invention provides a heat exchanger for indirectly exchanging heat between first and second fluids. The heat exchanger comprises a plurality of alternating first and second heat exchange passages for the first and second fluids to undergo indirect heat exchange. Corrugated fin-type material is provided within the first and second heat exchange passages to increase heat transfer area. A first inlet and outlet means is provided for introducing the first fluid into the first heat exchange passages and for discharging the first fluid from the first heat exchange passages, respectively.

A liquid distribution means is provided for distributing liquid composed of the second fluid into the second heat exchange passages. The liquid distribution means has overflow weirs from which the liquid overflows and falls into the second heat exchange passages. The overflow weirs are positioned to feed both sides of each of the first and second heat exchange passages. The corrugated fin-type material of the second heat exchange passages extend above the second heat exchange passages to ensure entry of the liquid into each corrugation of the corrugated fin-type material. A second inlet means is provided for introducing the second fluid, as the liquid, into the overflow weirs.

The extension of the corrugated material above the second heat exchange passages ensures that when liquid overflows the weirs, it will overflow into the corrugations to promote wetting of all corrugations.

BRIEF DESCRIPTION OF THE DRAWINGS

While the specification concludes with claims distinctly pointing the subject matter that Applicant regards as his invention, it is believed that the invention will be better understood when taken in connection with the accompanying drawing in which:

In FIGS. 3 and 6, the fragmentary views were taken with side bars removed in order to show heat exchanger internals.

DETAILED DESCRIPTION

Figure 1:
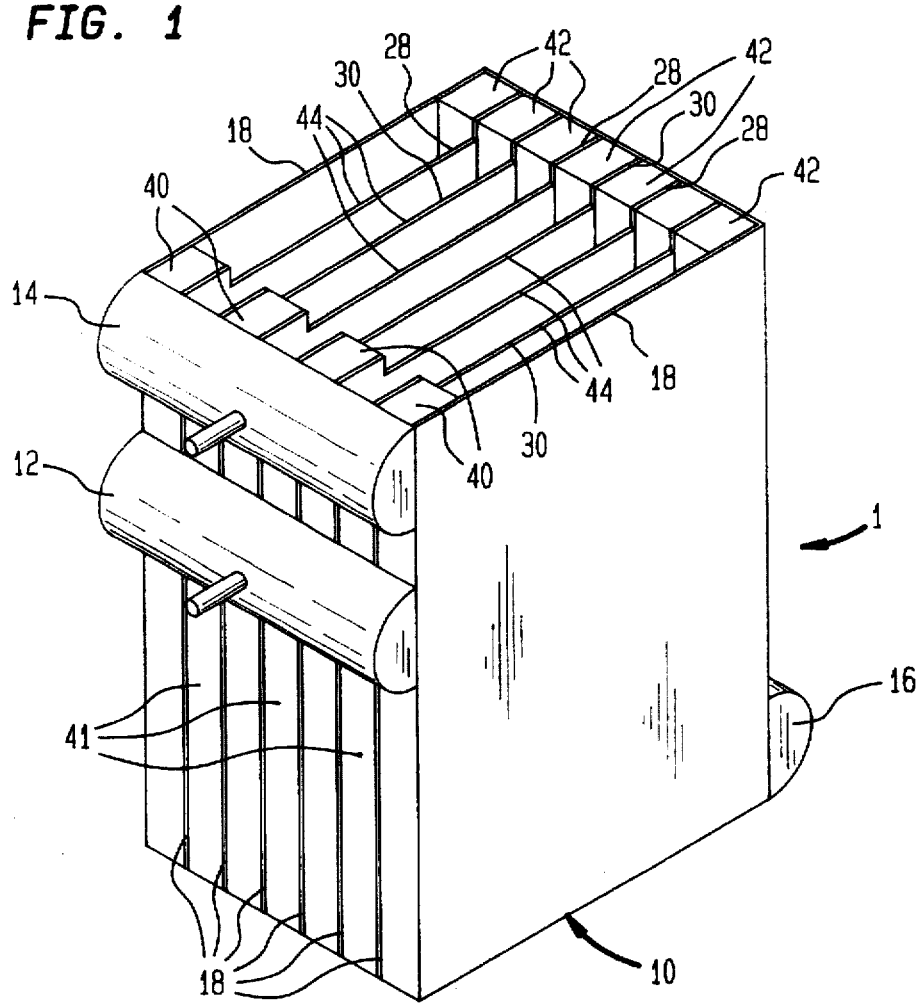
FIG. 1 is a perspective view of a heat exchanger in accordance with the present invention.
Figure 2:
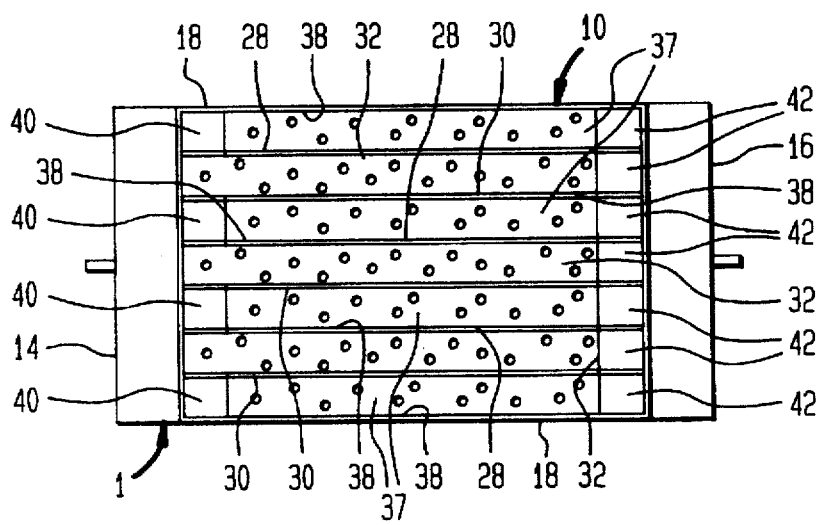
FIG. 2 is top plan view of FIG. 1.

With reference to FIGS. 1 and 2, a heat exchanger 1 in accordance with the present invention is illustrated. Heat exchanger 1 has inlet manifolds 12 and 14 through which first and second fluids are introduced into heat exchanger core 10. The first fluid could be nitrogen to be condensed and second fluid could be liquid oxygen to be vaporized. The condensed nitrogen is discharged from heat exchanger 1 through an outlet manifold 16.

Figure 3:
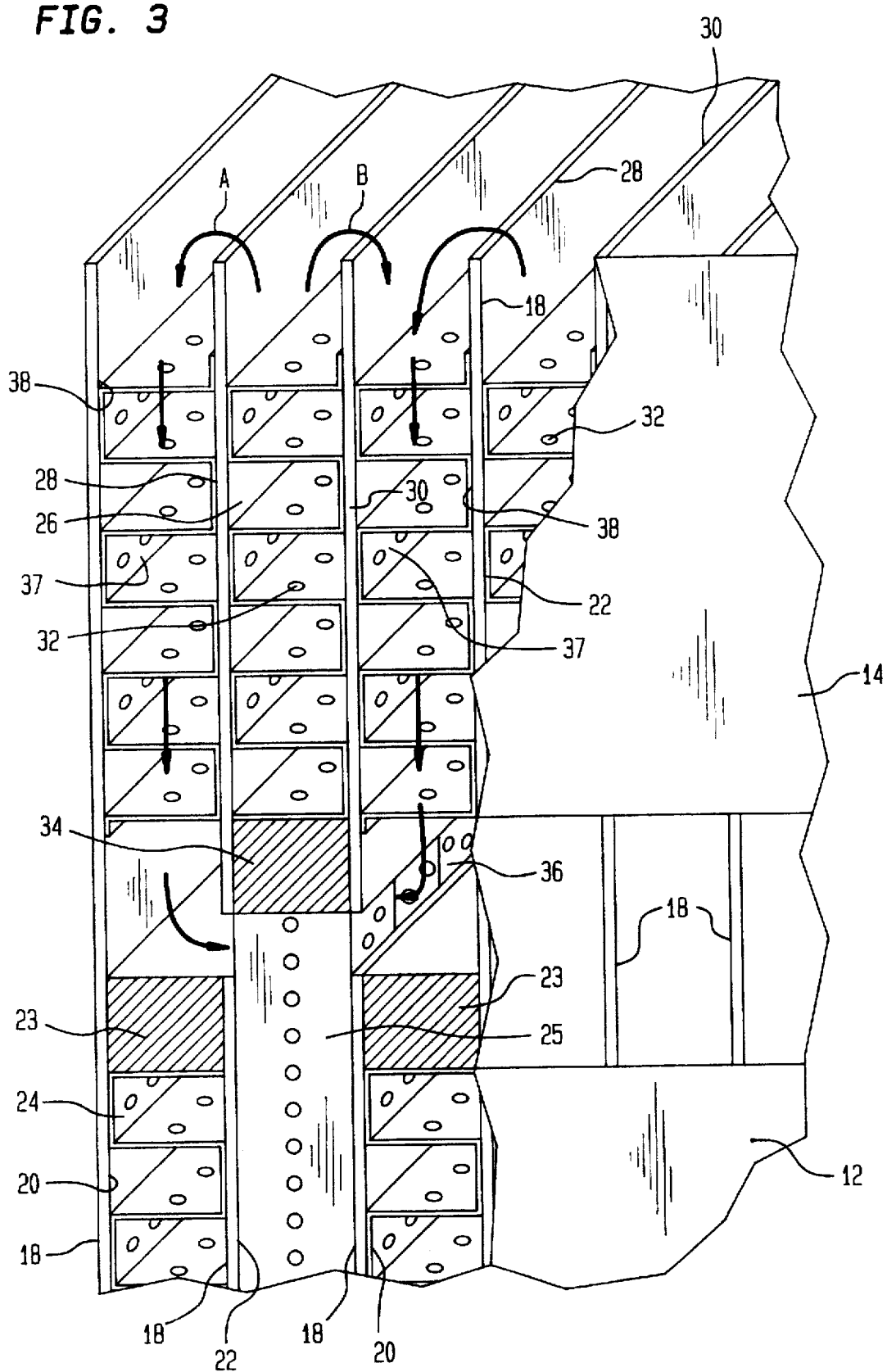
FIG. 3 is a fragmentary perspective view of FIG. 1 with portions of the heat exchanger broken away to show a liquid distribution system in accordance with the present invention.

With additional reference to FIG. 3, core 10 can be fabricated to be open at the bottom so that the second fluid (liquid oxygen) not vaporized within heat exchanger 1 simply falls from core 10. In this regard, as could be appreciated by those skilled in the art, heat exchanger 1 would be used in connection with a sump, either a separate tank or a sump of a distillation column, namely, the liquid oxygen sump of a lower pressure column of a double column air separation unit.

Core 10 is formed of a plurality of spaced apart parallel plates 18 to define first and second heat exchange passages 20 and 22. First fluid flows through first heat exchange passages 20 and the second fluid flows through heat exchange passages 22 so that heat is indirectly transferred between the first and second fluids.

In a conventional manner, dividing bars 23 seal first heat exchange passages 20 at the top of core 10. Although not illustrated, similar dividing bars seal first heat exchange passages 20 at the bottom of core 10. The first fluid enters first heat exchange passages 20 in a horizontal direction and is conducted by horizontally oriented corrugated fin-type material 24. Inclined corrugated fin-type material (not illustrated, but in a known manner) causes a transition in the flow from the horizontal to the vertical. Thereafter, the first fluid flows in a vertical direction, down first heat exchange passages 20. Corrugated fin-type material 25 fills both first and second heat exchange passages 20 and 22 in order to increase the effective area for transferring heat between the first and second fluids.

The second fluid as a liquid is fed into overflow weirs 26, defined between parallel plates 28 and 30, from which the liquid overflows as indicated by arrowheads A and B. Horizontally oriented corrugated fin-type material 32 is placed within overflow weirs 26 in order to assist in the distribution of liquid across the overflow weirs 26. Overflow weirs 26 are separated from second heat exchange passages 22 by means of dividing bars 34 resting on corrugated fin-type material 25. In order to ensure all of the corrugations, for instance corrugations 36 are wetted, corrugated fin-type material 25 is constructed so that it extends beyond the top of second heat exchange passages 22 or in other words, above plates 18 between which second heat exchange passages 22 are defined. In order to feed the liquid to corrugations 36 of corrugated fin material 25, collection pools 38 are provided so that overflow weirs 26 are positioned between collection pools 38. Liquid pools within collection pools 38 and is thus fed to both sides of corrugated fin material 25, for instance, corrugations 36 which extend beyond the top of second heat exchange passages 22. Horizontally oriented packing 37 may be placed in collection pools 38 to improve structural stability. The packing can be vertically oriented if necessary.

In order to prevent liquid, entering through inlet manifold 14, from flowing directly into collection pools 38 from inlet manifold 14, side bars 40 are provided (which have been removed in the fragmentary illustration of FIG. 3.) Side bars 40 have a gap at the location of horizontally oriented, corrugated fin-type material 24 to allow first fluid to be fed from inlet manifold 12. In this regard, inlet manifold 12 is situated at such gap and thus, opposite to horizontally oriented, corrugated fin-type material 25. Side bars 41 seal second heat exchange passages 22. In order to allow liquid to flow into overflow weirs 26, side bars 41 do not extend past dividing bars 34. First and second heat exchange passages 20 and 22 are sealed opposite to side bars 41 and 42 by side bars 42. As can be appreciated, the side bars 42 that are associated with first heat exchange passages 20 are set above outlet manifold 16 so that the second fluid can be discharged from manifold 16. Side bars 42 that are associated with second heat exchange passages 22 run the full height of heat exchanger core 10 because second heat exchange passages 22 are open at the bottom thereof.

Plates 18 that define second heat exchange passages 22 are provided with rectangular, slot-like cut outs 44 to permit liquid to be channeled from overflow weirs 26 to collection pools 38.

Figure 4:
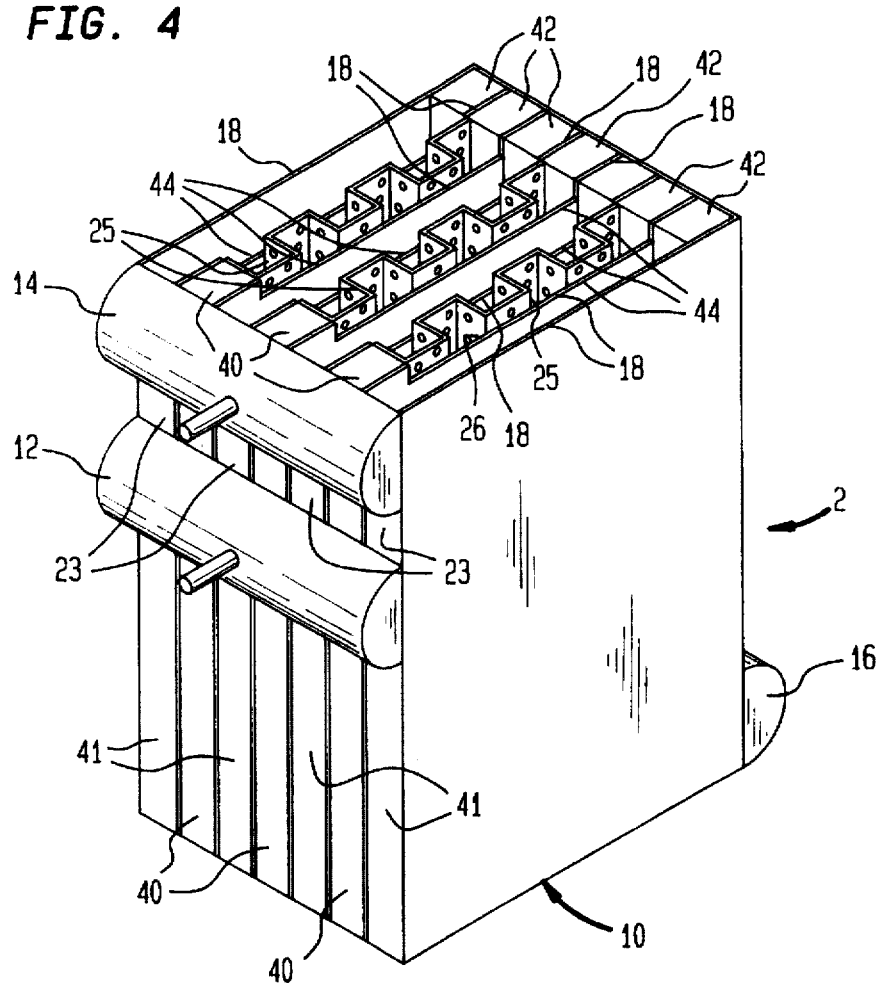
FIG. 4 illustrates is a perspective view of an alternative embodiment of the present invention.
Figure 5:
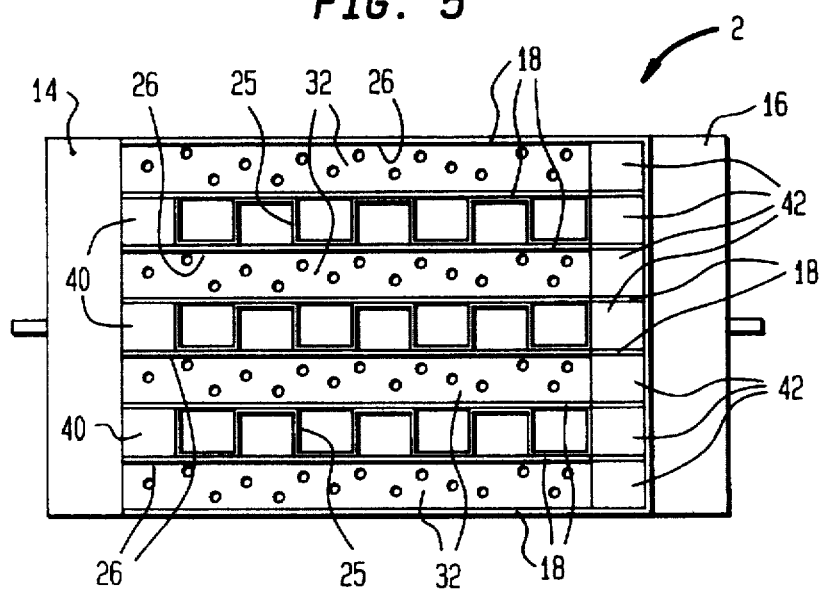
FIG. 5 is top plan view of FIG. 4.
Figure 6:
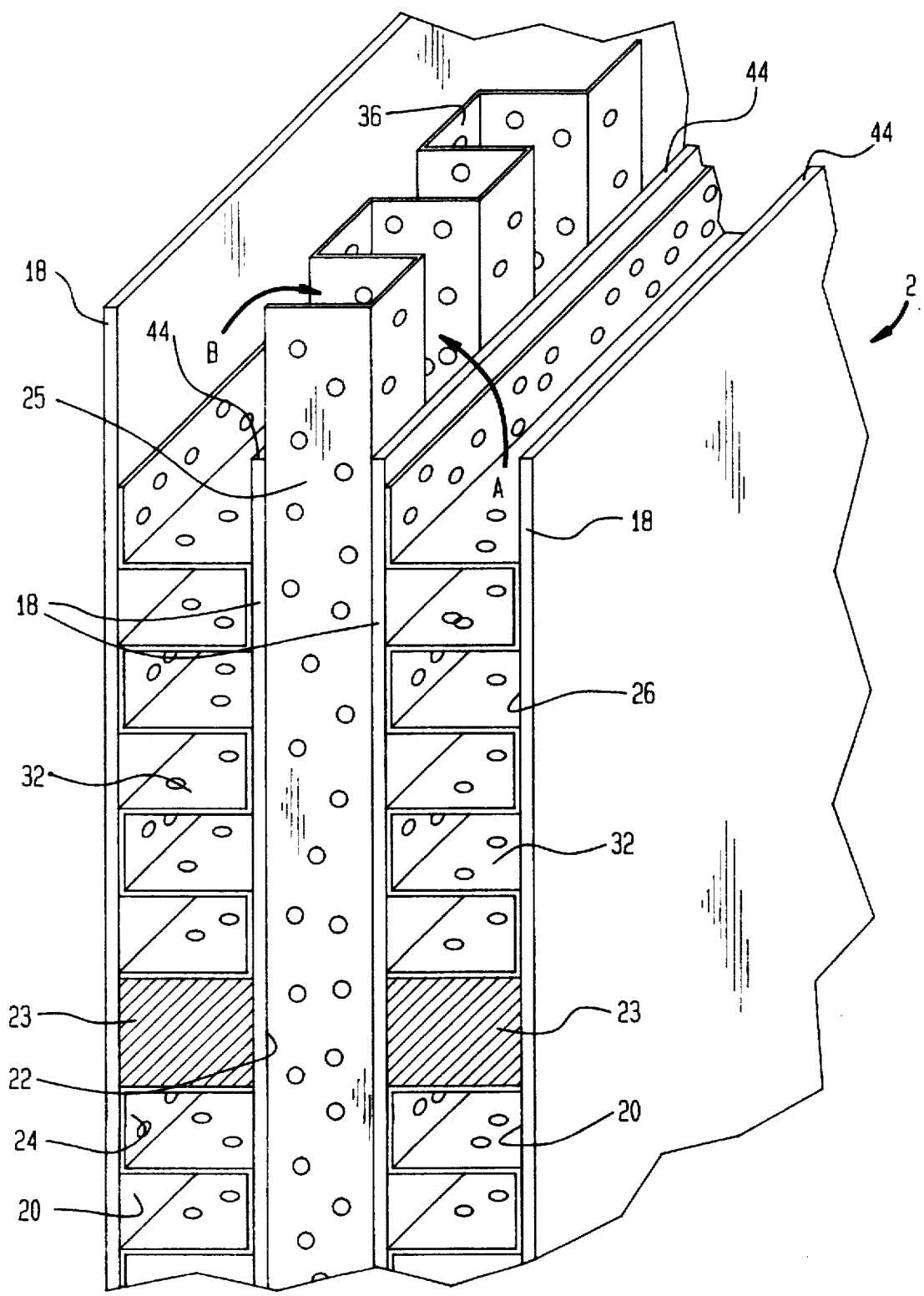
FIG. 6 is a fragmentary perspective view of FIG. 4 with portions of the heat exchanger broken away to illustrate a liquid distribution system in accordance with the present invention.

With reference to FIGS. 4, 5 and 6, an alternative embodiment of a heat exchanger 2 in accordance with the present invention is illustrated. In these illustrations, reference numerals that were used in describing heat exchanger 1 are repeated for components that are the same or repeated in heat exchanger 2.

In heat exchanger 2, again, corrugated fin material 25 is fabricated to extend beyond second heat exchange passages 22 so that corrugations 36 can all be wetted with the liquid. However, overflow weirs 26 instead of being positioned on top of second heat exchange passages 22, are positioned so that second heat exchange passages 22 are situated between overflow weirs 26. The overflow weirs are thus positioned above first heat exchange passages 20 and are separated therefrom by dividing bars 23. Liquid overflows overflow weirs 26 in the direction of arrowheads A and B into corrugations 36 of corrugated fin material 25. To this end, internal plates 18 defining second heat exchange passages 22 are provided with rectangular, slot-like cut-outs 44 adjacent corrugated fin material 25 of second heat exchange passages 22 to channel the second fluid to flow into corrugations 36.

Side bars 40 run the full height of heat exchanger core 10. Side bars 41 extend only up to first inlet manifold 12 to allow the first fluid to enter first heat exchange passages 20 through horizontally oriented, corrugated fin material 24. As such, dividing bars 23 extend so that, at their ends, they separate first and second inlet manifolds 12 and 14. Heat exchanger core 10 is sealed opposite to side bars 40 and 41 by side bars 42. Side bars 42 that are associated with first heat exchange passages 20 are set above outlet manifold 16 so that the second fluid can be discharged from outlet manifold 16. Side bars 42 that are associated with second heat exchange passages 22 run the full height of heat exchanger core 10 being that second heat exchange passages 22 are open at the bottom thereof for the discharge of liquid.

The heat exchanger core 10 of heat exchangers 1 and 2, although not illustrated, could be capped to prevent the escape of vaporized liquid and to more securely weld inlet manifold 14 to heat exchanger core 10. Such construction is well known in the art.

While the invention has been discussed with reference to preferred embodiment, as will be understood by those skilled in the art, numerous changes, additions and omissions may be made without departing from the spirit and scope of the present invention.

We claim:

1. A heat exchanger for indirectly exchanging heat between first and second fluids said heat exchanger comprising.

a plurality of alternating first and second heat exchange passages for said first and second fluids to undergo indirect heat exchanges;

corrugated fin-type material within said first and second heat exchange passages to increase heat transfer area within said first and second heat exchange passages;

first inlet and outlet means for introducing said first fluid into said first heat exchange passages and for discharging said first fluid from said first heat exchange passages, respectively:

liquid distribution means for distributing liquid composed of said second fluid into said second heat exchange passages, said liquid distribution means having overflow weirs from which said liquid overflows and falls into said second heat exchange passages, said overflow weirs positioned to feed both sides of each of said second heat exchange passages, and said corrugated fin-type material of said second heat exchange passages extending above said second heat exchange passages to ensure entry of the liquid into each of the corrugations of the corrugated fin-type material;

said overflow weirs located above said second heat exchange passages and are defined between parallel plates aligned with said plates defining said second heat exchange passages;

said distribution means further have collection pools positioned so that said overflow weirs are located between said collection pools and liquid after having overflowed said overflow weirs pools in said collection pools;

bottom regions of said collection pools being in communication with said second heat exchange passages so that liquid after having pooled within said collection pools enter said second heat exchange passages and is distributed by said corrugated fin-type material extending above said second heat exchange passages to said second heat exchange passages; and second inlet means for introducing said second fluid, as said liquid, into said overflow weirs.

2. The heat exchanger of claim 1, wherein:

first dividing bars separate said collection pools from said first heat exchange passages; and said corrugated material extending above said second heat exchange passages is separated from said overflow weirs by second dividing bars.

3. A heat exchanger for indirectly exchanging heat between first and second fluids, said heat exchanger comprising:

a plurality of alternating first and second heat exchange passages for said first and second fluids to undergo indirect heat exchange;

corrugated fin-type material within said first and second heat exchange passages to increase heat transfer area within said first and second heat exchange passages;

first inlet and outlet means for introducing said first fluid into said first heat exchange passages and for discharging said first fluid from said first heat exchange passages, respectively;

liquid distribution means for distributing liquid composed of said second fluid into said second heat exchange passages said liquid distribution means having overflow weirs from which said liquid overflows and falls into said second heat exchange passages, said overflow weir positioned to feed both sides of each of said second heat exchange passages, and said corrugated fin-type material of said second heat exchange passages extending above said second heat exchange passages to ensure entry of the liquid into each of the corrugations of the corrugated fin-type material;

said second heat exchange passages located between said overflow weirs;

said overflow weirs defined between said plates defining said first heat exchange passages;

said first heat exchange passages located below said overflow weirs and are configured such that said liquid, after having completely filled said overflow weirs, overflow, tops of said plates defining said first heat exchange passages and flows into said second heat exchange passages; and second inlet means for introducing said second fluid, as said liquid, into said overflow weirs.

4. The heat exchanger of claim 3, wherein dividing bars separate said overflow weirs from said first heat exchange passages.

5. The heat exchanger of claim 1 or claim 3, wherein said overflow weirs contain horizontally oriented, corrugated fin-type material.

* * * * *